United States Patent
Jang

(10) Patent No.: US 7,453,848 B2
(45) Date of Patent: Nov. 18, 2008

(54) ACCESS POINT DEVICE AND METHOD FOR SETTING CHANNEL OF THE SAME

(75) Inventor: Jung-In Jang, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 831 days.

(21) Appl. No.: 10/773,145

(22) Filed: Feb. 9, 2004

(65) Prior Publication Data

US 2004/0156382 A1 Aug. 12, 2004

(30) Foreign Application Priority Data

Feb. 10, 2003 (KR) .................. 10-2003-0008313

(51) Int. Cl.
*H04Q 7/00* (2006.01)
(52) U.S. Cl. .................. 370/329; 370/341
(58) Field of Classification Search .......... 370/329, 370/332, 333, 341, 431; 455/450, 451, 452, 455/464, 509, 62
See application file for complete search history.

(56) References Cited

U.S. PATENT DOCUMENTS

| | | | | |
|---|---|---|---|---|
| 5,329,575 A | * | 7/1994 | Matsuda | 455/463 |
| 5,329,591 A | * | 7/1994 | Magrill | 455/410 |
| 5,708,968 A | * | 1/1998 | Suzuki | 455/464 |
| 6,487,418 B1 | * | 11/2002 | Magana et al. | 455/464 |
| 2002/0060995 A1 | * | 5/2002 | Cervello et al. | 370/332 |
| 2003/0171116 A1 | | 9/2003 | Soomro | |
| 2003/0179734 A1 | | 9/2003 | Tsutsumi et al. | |
| 2003/0185244 A1 | | 10/2003 | Wu et al. | |

* cited by examiner

*Primary Examiner*—Ajit G Patel
(74) *Attorney, Agent, or Firm*—Robert E. Bushnell, Esq.

(57) ABSTRACT

An access point device and a technique for the access point device is for setting a channel of the access point device. The method for setting the channel of the access point device includes: a peripheral search for receiving information from peripheral access point devices, and searching channel numbers used by the peripheral access point devices; an optimal channel number decision selecting one of the channel numbers except for the used channel numbers, and deciding whether the selected channel number is an optimal channel number; and a channel setting for setting the selected channel number as a channel number when the selected channel number is the optimal channel number. As a result, the optimal channel number is automatically set so that the access point device can perform communication without being interrupted by the peripheral access point devices.

23 Claims, 8 Drawing Sheets

ACCESS POINT DEVICE AND METHOD FOR SETTING CHANNEL OF THE SAME

CLAIM OF PRIORITY

This application makes reference to, incorporates the same herein, and claims all benefits accruing under 35 U.S.C. §119 from an application for ACCESS POINT APPARATUS AND CHANNEL SETTING METHOD THEREOF earlier filed in the Korean Intellectual Property Office on 10 Feb. 2003 and there duly assigned Serial No. 2003-8313.

BACKGROUND OF THE INVENTION

1. Field of the Invention

The present invention relates to a wireless local area network (WLAN), more particularly to an access point device and a method for setting a channel of the access point device of the WLAN.

2. Description of Related Art

The WLAN has been standardized by IEEE (Institute of Electrical and Electronics Engineers) 802.11 committee.

The following illustrates the WLAN standardized by the IEEE 802.11 committee, especially an extended service set ESS.

The ESS includes a server, a distribution system and a plurality of basic service sets BSS. Each of the BSSes consists of an access point device, and stations. That is, a number of the stations connected to the access point device can be changed.

A connection method of the system is explained below.

In the BSSes, access point devices and the stations are respectively connected by transmitting/receiving frames pursuant to the IEEE 802.11 standards. Each of the stations transmits a probe request frame to all channel numbers, and each of the access point devices transmits a probe response frame to the stations. The stations determine the best accessible access point device and transmit an authentication request frame, and the access point devices transmit the authentication response frame to the stations. Each of the access point devices of the BSSes must previously set channel number to communicate with each of the stations. Here, the channel numbers of each of the access point devices preferably have an interval of three channels so that the access point devices can perform communication without being interrupted by the peripheral access point devices.

Such channel numbers are set in the access point devices during the production. In the case that a plurality of access point devices exist near the access point device, the access point device cannot obtain an appropriate channel interval from the peripheral access point devices. As a result, communication interruptions are generated on the WLAN.

In this case, the user using stations having a built-in peripheral search function program searches channels of the peripheral access point devices by executing the peripheral search function program. Thereafter, the user directly finds and sets the least interrupted channel according to the search result.

That is, the general access point device having the previously-set channel number may not obtain an appropriate channel interval from the peripheral access point devices, and thus generates interruptions during the communication. Accordingly, the user using the stations has to execute the program and manually find and set the non-interruption channel.

SUMMARY OF THE INVENTION

It is, therefore, an object of exemplary embodiments of the present invention to provide an access point device for automatically searching and setting an optimal channel number to prevent interruptions.

It is another object of the exemplary embodiments of the present invention to provide a method for setting a channel of an access point device.

It is yet another object to provide an access point device and method for setting the channel of the access point that improves operation reliability.

It is still another object to provide an access point device and method that is easy to implement and inexpensive.

To achieve the above and other objects, in accordance with an exemplary embodiment, the present invention provides an access point device including: a wireless transmission/reception unit for transmitting or receiving information of peripheral access point devices wirelessly; a control unit for searching channel numbers used by the peripheral access point devices from the information from the wireless transmission/reception unit, deciding an optimal channel number from the channel numbers except for the used channel numbers, and setting the optimal channel number as a channel number; and an operator terminal for managing and controlling the control unit.

In an exemplary embodiment, a method for setting a channel of an access point device includes: a peripheral search step for receiving information from peripheral access point devices, and searching channel numbers used by the peripheral access point devices; an optimal channel number decision step for selecting one of the channel numbers except for the used channel numbers, and deciding whether the selected channel number is an optimal channel number; and a channel setting step for setting the selected channel number as a channel number when the selected channel number is the optimal channel number.

In an exemplary embodiment, the peripheral search step includes: a probe request frame transmission step for transmitting a probe request frame to the peripheral access point devices; a probe response frame reception step for receiving probe response frames from the peripheral access point devices for a predetermined time; and a channel number extraction step for extracting channel numbers from the probe response frames, and storing the extracted channel numbers, or includes: a beacon frame reception step for receiving beacon frames from the peripheral access point devices for a predetermined time; and a channel number extraction step for extracting channel numbers from the beacon frames, and storing the extracted channel numbers.

In an exemplary embodiment, the optimal channel number decision step includes the steps of: selecting one of the channel numbers except for the used channel numbers; and deciding whether the channel numbers obtained by subtracting '1' and '2' from the selected channel number and the channel numbers obtained by adding '1' and '2' to the selected channel number have been used.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1:
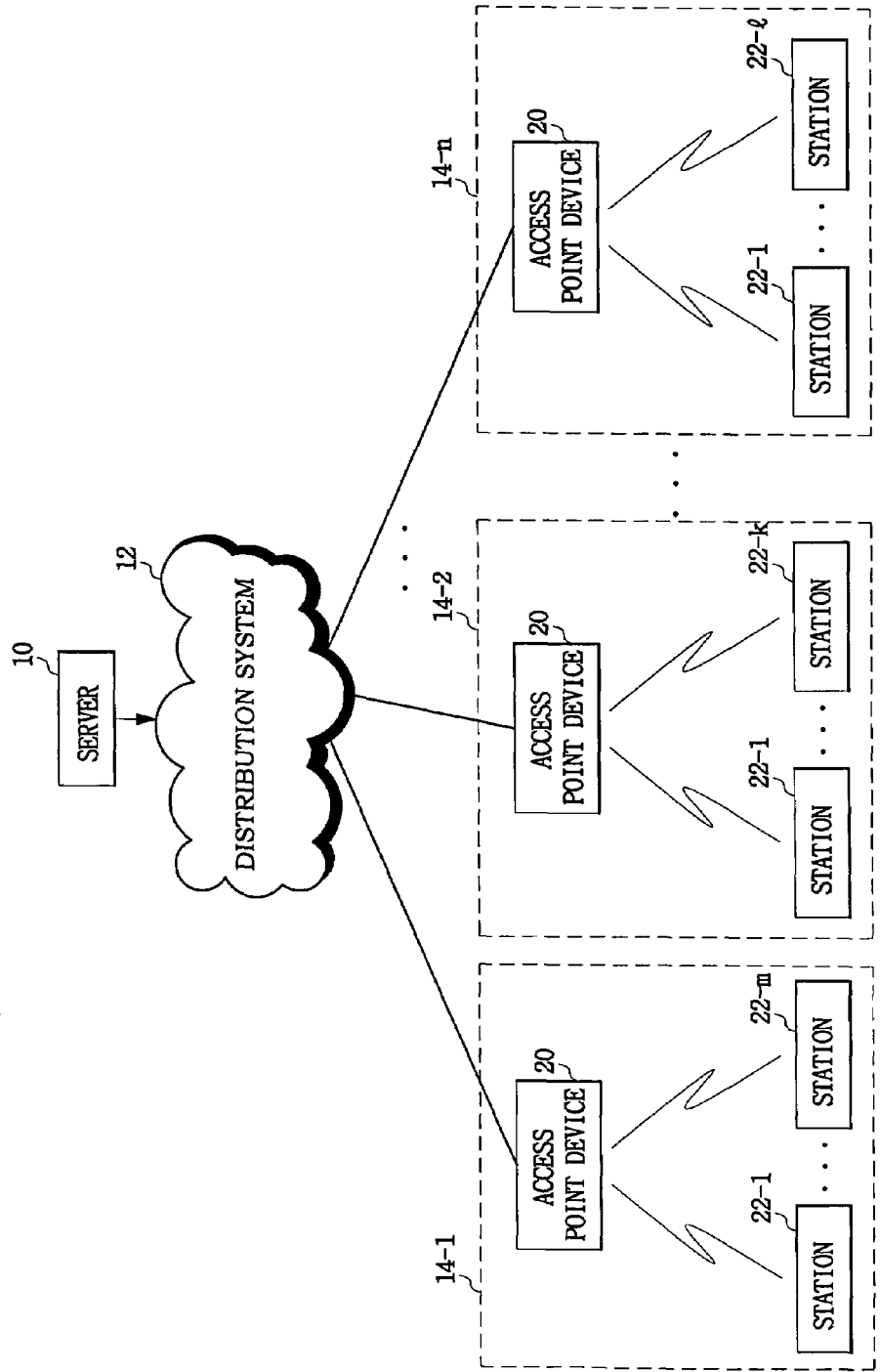
FIG. 1 is a block diagram illustrating the WLAN standardized by IEEE 802.11 committee.

Turning now to the drawings, FIG. 1 is a block diagram illustrating the WLAN standardized by the IEEE 802.11 committee, especially an extended service set ESS.

Referring to FIG. 1, the ESS includes a server 10, a distribution system 12 and a plurality of basic service sets BSS 14-1~14-n. Each of the BSSes 14-1~14-n consists of an access point device 20, and m, k, . . . , l stations 22-1~22-m, 22-1~22-k, . . . , 22-1~22-l. That is, a number of the stations connected to the access point device 20 can be changed.

A connection method of the system of FIG. 1 is explained below.

In the BSSes 14-1~14-n, access point devices 20 and the stations 22-1~22-m, 22-1~22-k, . . . , 22-1~22-l are respectively connected by transmitting/receiving frames pursuant to the IEEE 802.11 standards. Each of the stations 22-1~22-m, 22-1~22-k, . . . , 22-1~22-l transmits a probe request frame to all channel numbers, and each of the access point devices 20 transmits a probe response frame to the stations 22-1~22-m, 22-1~22-k, . . . , 22-1~22-l. The stations 22-1~22-m, 22-1~22-k, . . . , 22-1~22-l determine the best accessible access point device 20 and transmit an authentication request frame, and the access point devices 20 transmit the authentication response frame to the stations 22-1~22-m, 22-1~22-k, . . . , 22-1~22-l. Each of the access point devices 20 of the BSSes 14-1~14-n must previously set channel number to communicate with each of the stations 22-1~22-m, 22-1~22-k, . . . , 22-1~22-l. Here, the channel numbers of each of the access point devices 20 preferably have an interval of three channels so that the access point devices 20 can perform communication without being interrupted by the peripheral access point devices 20.

Such channel numbers are set in the access point devices during the production. In the case that a plurality of access point devices exist near the access point device, the access point device cannot obtain an appropriate channel interval from the peripheral access point devices. As a result, communication interruptions are generated on the WLAN.

In this case, the user using stations having a built-in peripheral search function program searches channels of the peripheral access point devices by executing the peripheral search function program. Thereafter, the user directly finds and sets the least interrupted channel according to the search result.

That is, the general access point device having the previously-set channel number may not obtain an appropriate channel interval from the peripheral access point devices, and thus generates interruptions during the communication. Accordingly, the user using the stations has to execute the program and manually find and set the non-interruption channel.

Reference will now be made in detail to exemplary embodiments of the present invention, which are illustrated in the accompanying drawings.

Figure 2:
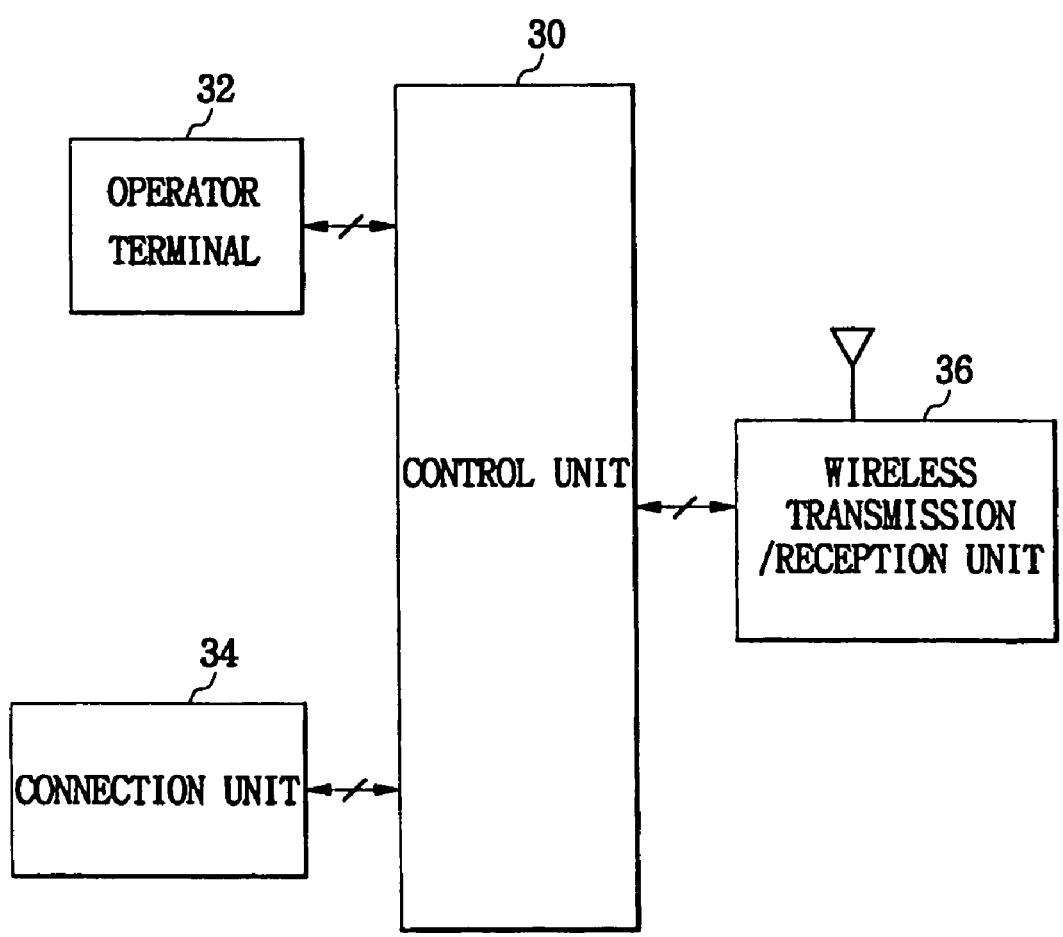
FIG. 2 is a block diagram illustrating an access point device in accordance with an exemplary embodiment of the present invention.

FIG. 2 is a block diagram illustrating an access point device in accordance with an exemplary embodiment of the present invention, including a control unit 30, an operator terminal 32, a connection unit 34 and a wireless transmission/reception (transmission or reception or both transmission and reception) unit 36.

The functions of each block of the access point device of FIG. 2 are described.

The operator terminal 32 manages and controls the control unit 30. The control unit 30 previously stores a built-in channel setting program and executes the program in initialization under the control of the operator terminal 32, to automatically search peripheral access point devices, find an optimal channel and set a channel number. The connection unit 34 is connected to the distribution system 12 of FIG. 1 under the control of the control unit 30. The wireless transmission/reception unit 36 transmits/receives (transmits and/or receives) signals to/from (to and/or from) the stations or access point devices of FIG. 1.

That is, the access point device of FIG. 2 automatically sets a channel by executing the channel setting program in initialization and desired time, or predetermined time interval.

Figure 3:
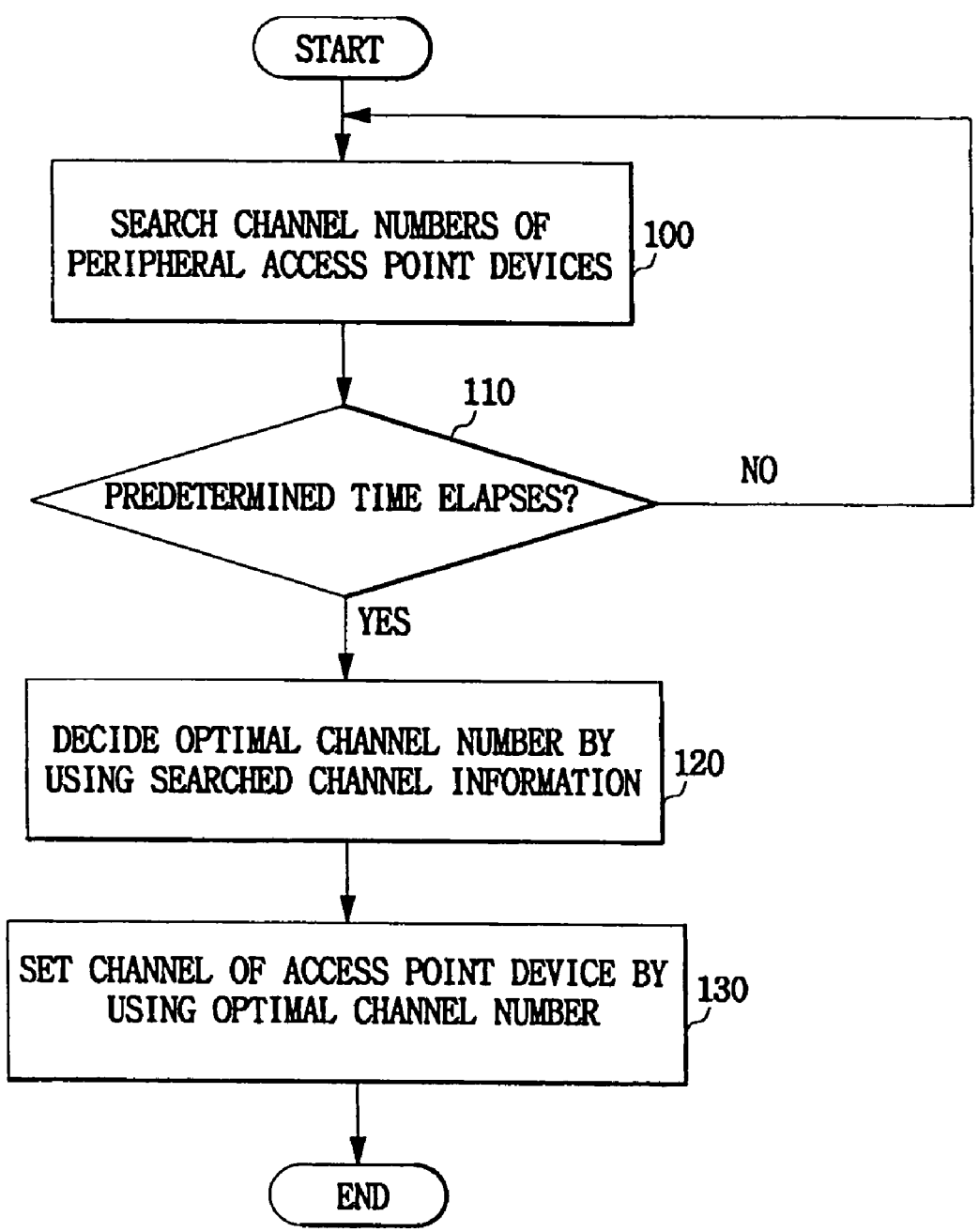
FIG. 3 is a flowchart showing sequential steps of a method for setting a channel of an access point device in accordance with an exemplary embodiment of the present invention.

FIG. 3 is a flowchart showing sequential steps of a method for setting a channel of an access point device in accordance with the present invention. That is, the operation of the channel setting program stored in the control unit 30 of FIG. 2 is explained. The access point device performs the operation of FIG. 3 in initialization and desired time, or predetermined time interval.

First, the access point device searches channel numbers used by the peripheral access point devices (step 100).

The access point device decides whether a predetermined time elapses (step 110).

When the predetermined time does not elapse, the routine goes back to step 100, and when the predetermined time elapses, the routine goes to the next step. Here, the predetermined time is an appropriate time taken to receive information from each peripheral access point device.

The access point device decides an optimal channel number by using the searched channel numbers (step 120).

The access point device sets the decided optimal channel number as its channel number (step 130). Thereafter, the access point device is initialized and operated.

Figure 4:
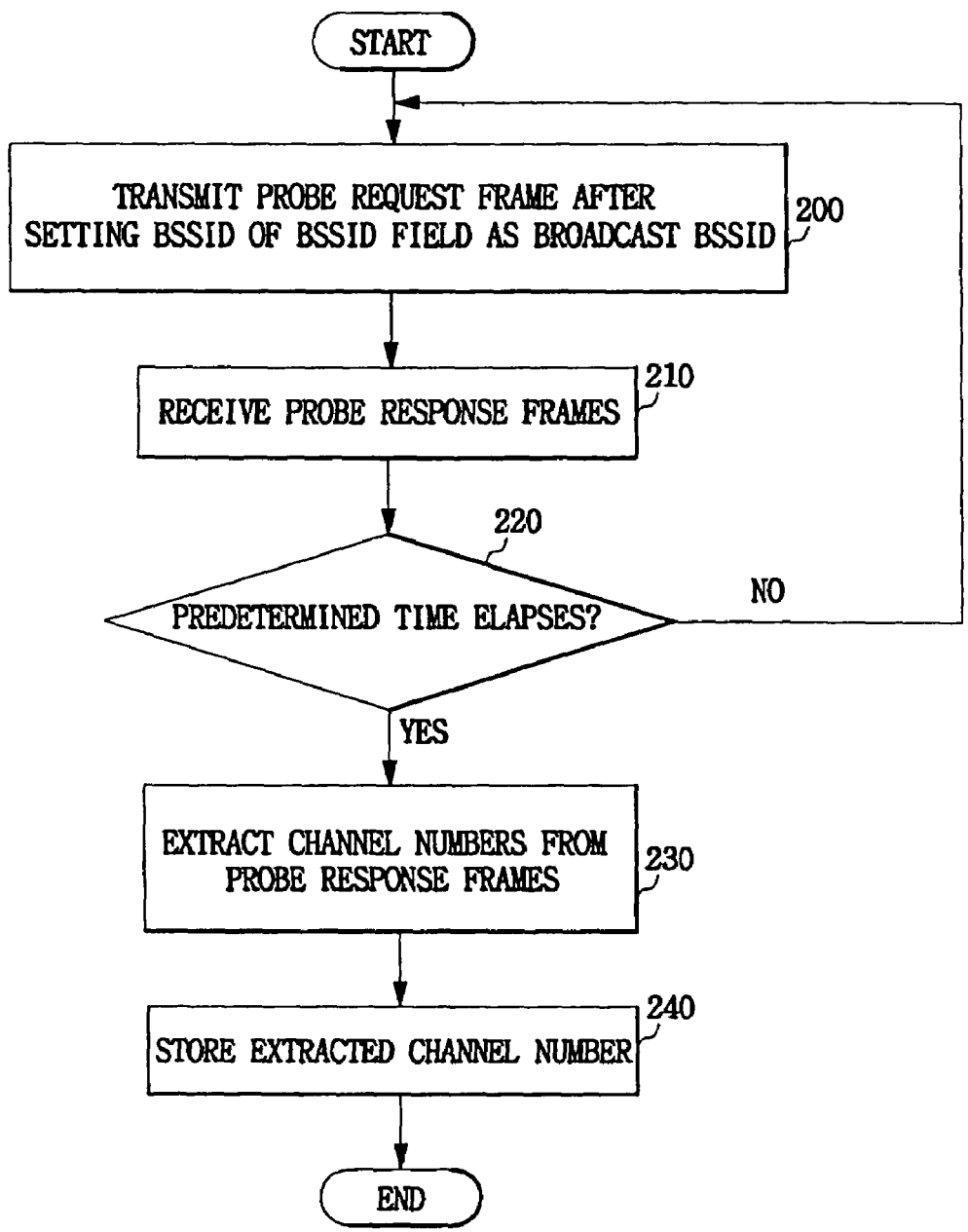
FIG. 4 is a flowchart showing an operation of a peripheral search step of FIG. 3.

FIG. 4 is a flowchart showing the operation of the peripheral search step of FIG. 3. That is, the operation of step 100 of FIG. 3 is explained.

The access point device sets basic service set identifiers BSSID as broadcast BSSIDs, and transmits a probe request frame (step 200).

In step 200, the access point device transmits the probe request frame to the peripheral access point devices.

Figure 5:
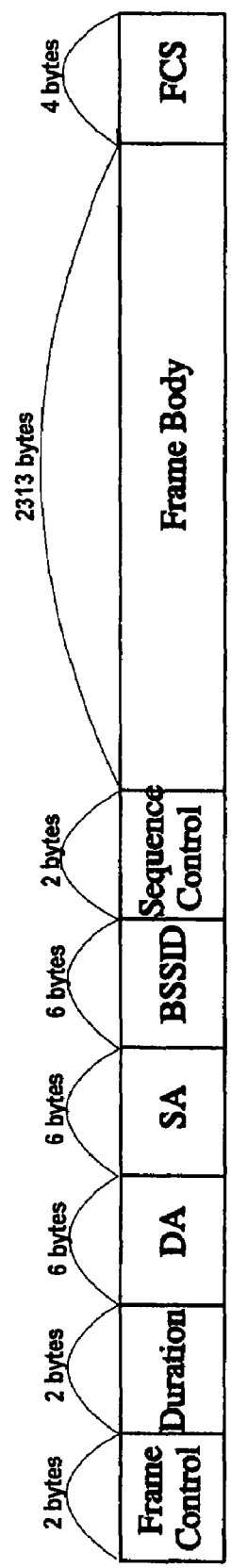
FIG. 5 is a structure diagram illustrating a frame transmitted/received between the access point devices.

As shown in FIG. 5, the probe request frame is comprised of a total 2341 bytes under the IEEE 802.11 standards. Here, the fifth to eighth bits of a frame control field are set as '0100', to form the probe request frame. The BSSID is positioned in a field of the seventeenth to twenty-second bytes of the probe request frame.

That is, in step 200, the access point device sets the broadcast BSSID by setting the BSSID field of the seventeenth to twenty second bytes of the probe request frame of FIG. 5 as '0', and transmits the probe request frame to the peripheral access point devices.

The access point device receives probe response frames from the peripheral access point devices (step 210).

When receiving the probe request frame whose BSSID has been set as the broadcast BSSID, the peripheral access point devices must transmit the probe response frames pursuant to the IEEE 802.11 standards.

The probe response frame has the same structure as the probe request frame of FIG. 5. Here, the fifth to eighth bytes of a frame control field are set as '0101', to form the probe response frame.

The access point device decides whether a predetermined time elapses. When the predetermined time does not elapse, the routine goes back to step 200, and when the predetermined time elapses, the routine goes to the next step (step 220). Here, the predetermined time is an appropriate time taken to receive the probe response frames from the peripheral access point devices.

The access point device tracks used channel numbers from DS (direct sequence) parameter sets of frame bodies comprised of a total 2313 bytes of the probe response frames (step 230).

That is, the frame body of the probe response frame includes the DS parameter set which has the used channel number. Accordingly, the channel numbers can be tracked by using the probe response frames.

The access point device stores the tracked (or extracted) channel numbers in a memory of the control unit 30 (step 240).

In the peripheral search step of FIG. 4, the access point device is operated as a station, for transmitting the probe request frame to the peripheral access point devices, and searching the used channel numbers from the probe response frames transmitted from the peripheral access point devices.

Figure 6:
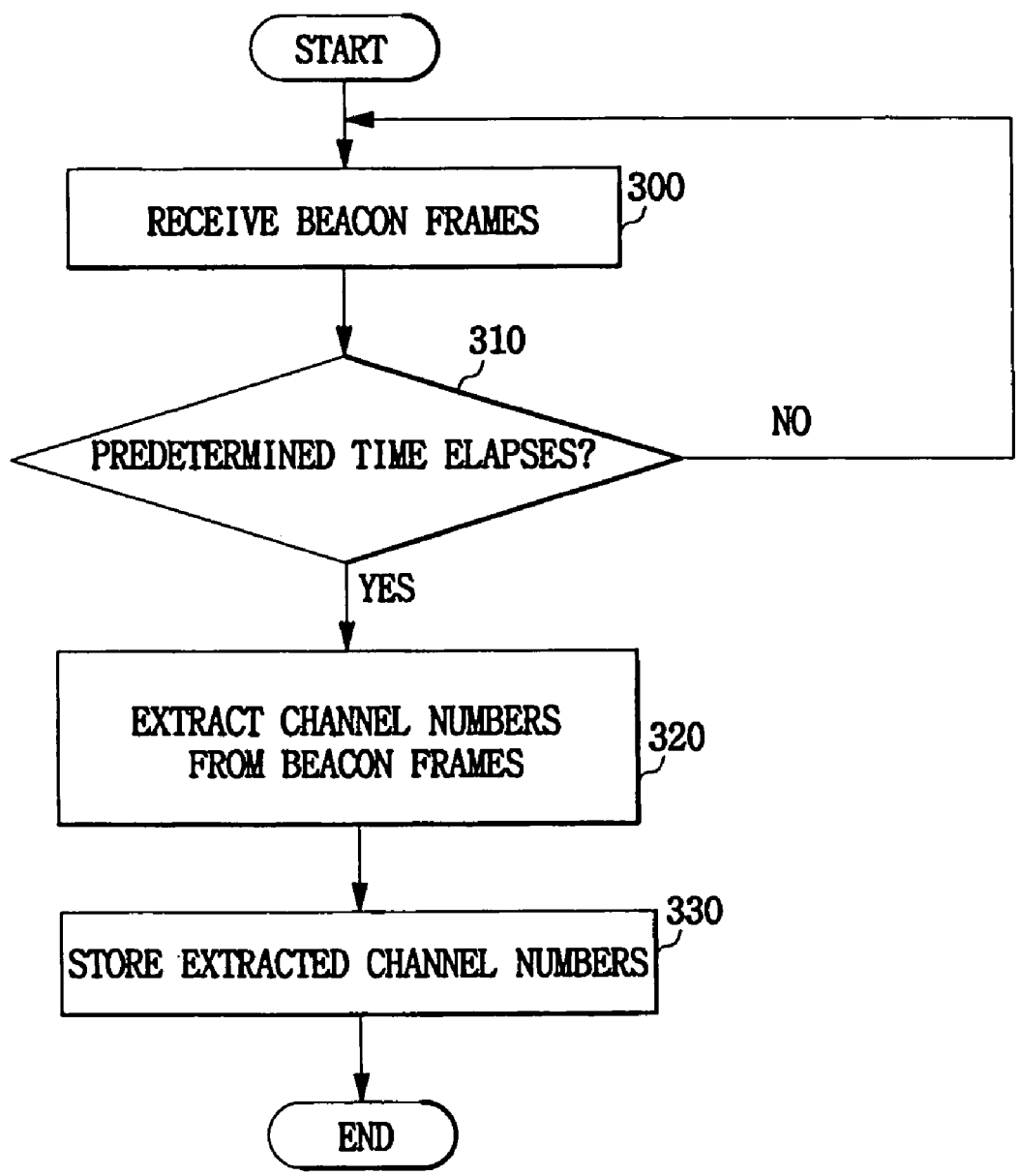
FIG. 6 is a flowchart showing another example of the operation of the peripheral search step of FIG. 3.

FIG. 6 is a flowchart showing another example of the operation of the peripheral search step of FIG. 3. That is, another example of the operation of step 100 of FIG. 3 is explained.

The access point device receives beacon frames transmitted from the peripheral access point devices (step 300).

Each of the access point devices periodically transmits the beacon frame in order to notify their information pursuant to the IEEE 802.11 standards. The beacon frame has the same structure as the probe request frame of FIG. 5. Here, fifth to eighth bytes of a frame control field are set as '1000', to form the beacon frame.

The access point device decides whether a predetermined time elapses (step 310).

When the predetermined time does not elapse, the routine goes back to step 300, and when the predetermined time elapses, the routine goes to the next step. Here, the predetermined time is an appropriate time taken to receive the beacon frames from the peripheral access point devices.

The access point device extracts (or tracks) channel numbers from DS parameter sets of frame bodies comprised of the total 2313 bytes of the received beacon frame (step 320).

Identically to the frame body of the probe response frame, the frame body of the beacon frame includes the DS parameter set which has the used channel number. Accordingly, the channel number can be tracked by using the beacon frame.

The access point device stores the tracked channel numbers in the memory of the control unit 30 (step 330).

In the peripheral search method of FIG. 6, the access point device receives the beacon frames from the peripheral access point devices, and searches the used channel numbers from the beacon frames.

Figure 7:
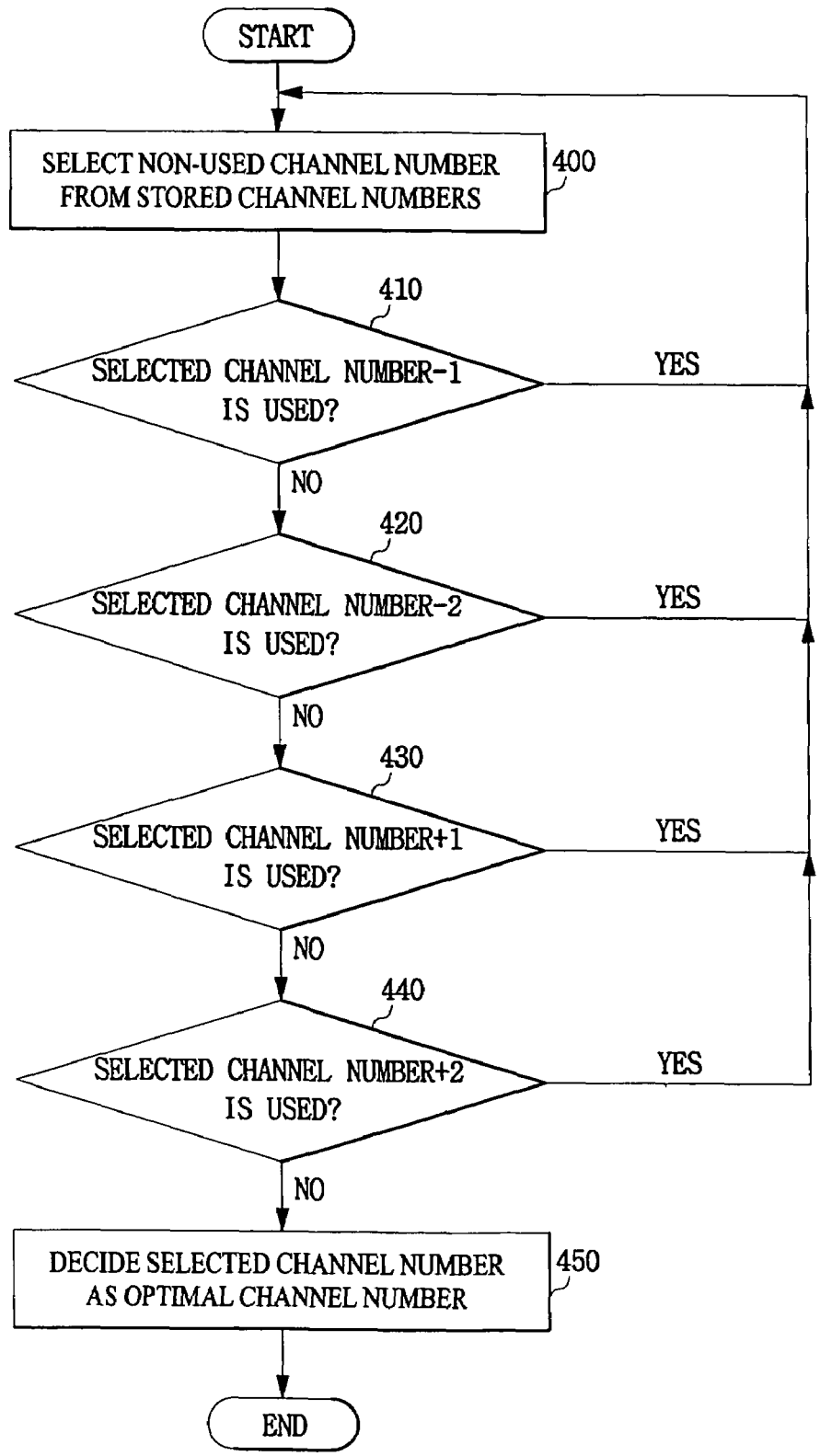
FIG. 7 is a flowchart showing an operation of an optimal channel number decision step of FIG. 3.

FIG. 7 is a flowchart showing the operation of the optimal channel number decision step of FIG. 3. That is, the operation of step 120 of FIG. 3 is explained.

The access point device selects a non-used channel number from the channel numbers stored in the peripheral search step (step 400).

In step 400, the non-used channel number is selected from the stored channel numbers.

The access point device decides whether the channel number obtained by subtracting '1' from the selected channel number has been used (step 410).

When the channel number obtained by subtracting '1' from the selected channel number has been used, the routine goes back to step 400 to select another non-used channel number, and when the channel number obtained by subtracting '1' from the selected channel number has not been used, the routine goes to the next step.

The access point device decides whether the channel number obtained by subtracting '2' from the selected channel number has been used (step 420).

In step 420, when the channel number obtained by subtracting '2' from the selected channel number has been used, the routine goes back to step 400, and when the channel number has not been used, the routine goes to the next step.

In step 430 and step 440, the access point device decides whether the channel number obtained by adding '1' to the selected channel number and the channel number obtained by adding '2' to the selected channel number, respectively, have been used. When the channel numbers have been used, the routine goes back to step 400, and when the channel numbers have not been used, the routine goes to the next step.

That is, the access point device must have an interval of three channels from the peripheral access point devices in order to perform communication without interruptions.

Therefore, the access point device determines whether the non-used channel number selected in step 410 to step 440 has an interval of three channels from the channel numbers of the peripheral access point devices.

If so, the access point device decides the channel number selected in step 400 as the optimal channel number (step 450).

The present invention can also be realized as computer-executable instructions in computer-readable media. The computer-readable media includes all possible kinds of media in which computer-readable data is stored or included or can include any type of data that can be read by a computer or a processing unit. The computer-readable media include for example and is not limited to, storage media, such as magnetic storage media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, and other semiconductor media, electronic media, electromagnetic media and infrared media. The data may be transmitted via a communication medium such as carrier waves (e.g., transmission via the Internet or another computer). The transmission paths of a communication medium generally carry computer-readable instructions, data structures, program modules or other data in a modulated signal such as the carrier waves or other transportable mechanism including any information delivery media. Computer-readable media may also be transmitted via such as a wireless media such as radio frequency, infrared microwaves, and wired media such as a wired network. Also, the computer-readable media can store computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 8:
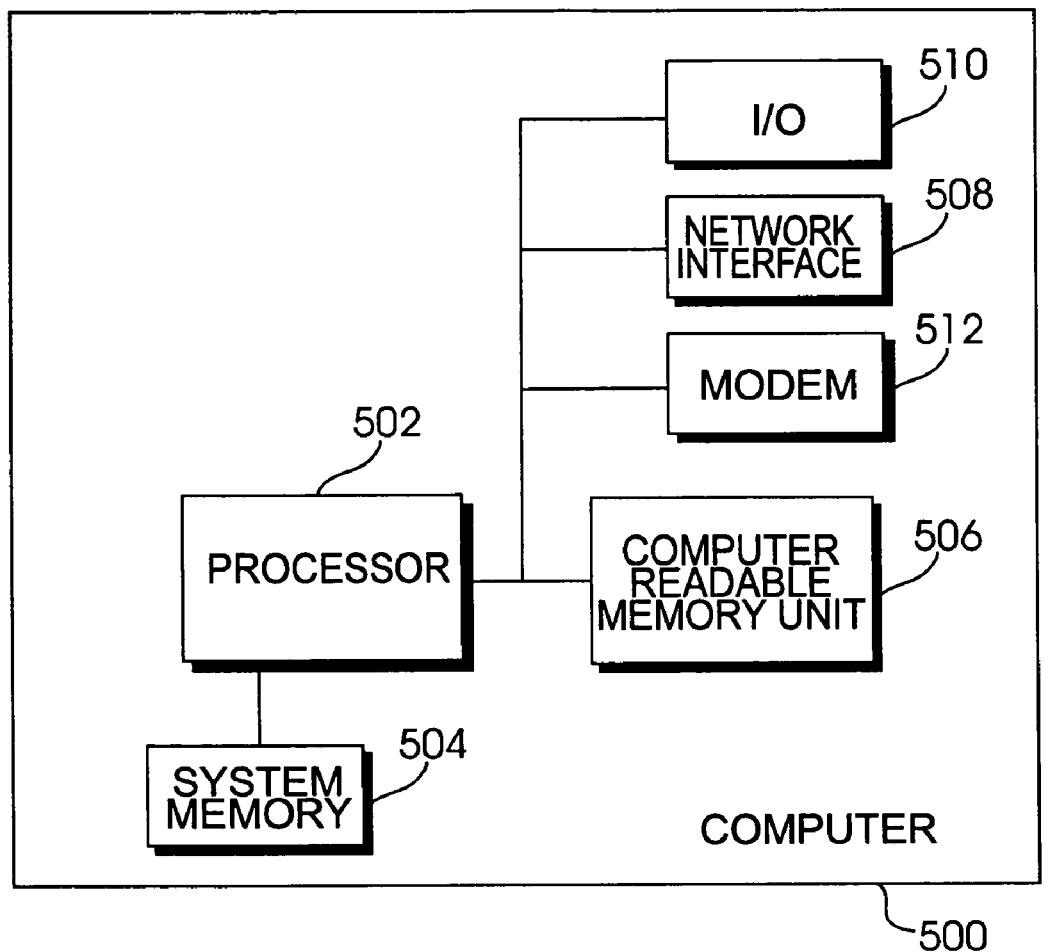
FIG. 8 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 8. The computer 500 includes a processor 502 that controls the computer 500. The processor 502 uses the system memory 504 and a computer readable memory device 506 that includes certain computer readable recording media. A system bus connects the processor 502 to a network interface 508, modem 512 or other interface that accommodates a connection to another computer or network such as the Internet. The system bus may also include an input and output interface 510 that accommodates connection to a variety of other devices.

As described above, the access point device automatically sets the optimal channel number by communicating with the peripheral access point devices in initialization and desired time, or predetermined time interval.

In addition, when the access point device fails to automatically search the optimal channel number according to the aforementioned method, the channel is manually set as in the related art.

Accordingly, the access point device and the method for setting the channel of the same automatically set the optimal channel number so that the access point device can perform communication without being interrupted by the peripheral access point devices.

The access point device and the method for setting the channel of the same improve operation reliability.

While the present invention has been particularly shown and described with reference to exemplary embodiments thereof, it will be understood by those skilled in the art that the foregoing and other changes in form and details may be made therein without departing from the spirit and scope of the present invention.

What is claimed is:

1. An access point device, comprising:
   a wireless transmission and reception unit for transmitting information of the access point where the wireless transmission and reception unit is located at or receiving information of peripheral access point devices wirelessly;
   a control unit for searching channel numbers used by the peripheral access point devices from the information from the wireless transmission and reception unit, deciding an optimal channel number from the channel numbers except for the used channel numbers, and setting the optimal channel number as a channel number;
   the control unit, when searching channel numbers used by the peripheral access point devices, transmitting a probe request frame to the peripheral access point devices, receiving probe response frames from the peripheral access point devices for a predetermined time, extracting the channel numbers from the received probe response frames, and storing the extracted channel numbers; and
   an operator terminal for managing and controlling the control unit.

2. The device according to claim 1, wherein the control unit transmits the probe request frame after setting a basic service set identifiers field of the probe request frame as broadcast basic service set identifiers.

3. The device according to claim 1, wherein the control unit extracts the channel numbers from direct sequence parameter sets of frame bodies of the probe response frames.

4. An access point device, comprising:
   a wireless transmission and reception unit transmitting information of the access point where the wireless transmission and reception unit is located at or receiving information of peripheral access point devices wirelessly;
   a control unit searching channel numbers used by the peripheral access point devices from the information from the wireless transmission and reception unit, deciding an optimal channel number from among the channel numbers except for the used channel numbers, and setting the optimal channel number as a designated channel number;
   the control unit, when searching channel numbers used by the peripheral access point devices, receiving beacon frames from the peripheral access point devices for a predetermined time, extracting the channel numbers from the beacon frames, and storing the extracted channel numbers; and
   an operator terminal managing and controlling the control unit.

5. The device according to claim 4, wherein the control unit extracts the channel numbers from direct sequence parameter sets of frame bodies of the beacon frames.

6. An access point device, comprising:
   a wireless transmission and reception unit transmitting information of the access point where the wireless transmission and reception unit is located at or receiving information of peripheral access point devices wirelessly;
   a control unit searching channel numbers used by the peripheral access point devices from the information from the wireless transmission and reception unit, deciding an optimal channel number from among the channel numbers except for the used channel numbers, and setting the optimal channel number as a channel number;
   the control unit, when searching channel numbers used by the peripheral access point devices, receiving beacon frames from the peripheral access point devices for a predetermined time, extracting the channel numbers from the beacon frames, and storing the extracted channel numbers;
   the control unit, when determining the optimal channel number, selecting one of the channel numbers except for the used channel numbers, deciding whether the channel numbers obtained by subtracting '1' and '2' from the selected channel number and the channel numbers obtained by adding '1' and '2' to the selected channel number have been used, and setting the selected channel number as the optimal channel number when the channel numbers have not been used; and
   an operator terminal managing and controlling the control unit.

7. A method for setting a channel of an access point device, comprising:
- a peripheral search step for receiving information from peripheral access point devices, and searching channel numbers used by the peripheral access point devices;
- the peripheral search step comprising the steps of a probe request frame transmission step transmitting a probe request frame to the peripheral access point devices, a probe response frame reception step receiving probe response frames from the peripheral access point devices for a predetermined time, and a channel number extraction step extracting channel numbers from the received probe response frames and storing the extracted channel numbers;
- an optimal channel number decision step for selecting one of the channel numbers except for the used channel numbers, and deciding whether the selected channel number is an optimal channel number; and
- a channel setting step for setting the selected channel number as a channel number when the selected channel number is the optimal channel number.

8. The method according to claim 7, wherein the probe request frame transmission step transmits the probe request frame after setting basic service set identifiers field of the probe request frame as broadcast basic service set identifiers.

9. The method according to claim 7, wherein the channel number extraction step extracts the channel numbers from direct sequence parameter sets of frame bodies of the probe response frames.

10. A method for setting a channel of an access point device, comprising:
- a peripheral search step receiving information from peripheral access point devices, and searching channel numbers used by the peripheral access point devices;
- the peripheral search step comprising the steps of a beacon frame reception step receiving beacon frames transmitted from the peripheral access point devices for a predetermined time, and a channel number extraction step extracting the channel numbers from the beacon frames and storing the extracted channel numbers;
- an optimal channel number decision step selecting one of the channel numbers except for the used channel numbers, and deciding whether the selected channel number is an optimal channel number; and
- a channel setting step setting the selected channel number as a channel number when the selected channel number is the optimal channel number.

11. The method according to claim 10, wherein the beacon frame reception step extracts the channel numbers from direct sequence parameter sets of frame bodies of the beacon frames.

12. A method for setting a channel of an access point device, comprising:
- a peripheral search step receiving information from peripheral access point devices, and searching channel numbers used by the peripheral access point devices;
- the peripheral search step comprising the steps of a probe request frame transmission step transmitting a probe request frame to the peripheral access point devices, a probe response frame reception step receiving probe response frames from the peripheral access point devices for a predetermined time, and a channel number extraction step extracting channel numbers from the received probe response frames and storing the extracted channel numbers;
- an optimal channel number decision step selecting one of the channel numbers except for the used channel numbers, and deciding whether the selected channel number is an optimal channel number;
- the optimal channel number decision step comprising selecting one of the channel numbers except for the used channel numbers, and deciding whether the channel numbers obtained by subtracting 1 and 2 from the selected channel number and the channel numbers obtained by adding 1 and 2 to the selected channel number have been used; and
- a channel setting step setting the selected channel number as a designated channel number when the selected channel number is the optimal channel number.

13. An apparatus, comprising:
- a first unit transmitting information of the access point where the first unit is located at or receiving information of peripheral access point devices wirelessly;
- a second unit searching channel numbers used by the peripheral access point devices from the information from the first unit, deciding an optimal channel number from the channel numbers except for the used channel numbers, and setting the optimal channel number as a channel number, when searching the channel numbers, the second unit transmitting a probe request frame to the peripheral access point devices, receiving probe response frames from the peripheral access point devices for a predetermined time, and extracting the channel numbers from the received probe response frames; and
- a third unit managing and controlling the second unit.

14. The apparatus according to claim 13, wherein the second unit stores the extracted channel numbers.

15. The apparatus according to claim 14, wherein the second unit transmits the probe request frame after setting basic service set identifiers field of the probe request frame as broadcast basic service set identifiers.

16. The apparatus according to claim 15, wherein the second unit extracts the channel numbers from direct sequence parameter sets of frame bodies of the probe response frames.

17. The apparatus according to claim 16, wherein, when determining the optimal channel number, the second unit selects one of the channel numbers except for the used channel numbers, decides whether the channel numbers obtained by subtracting a first number and a second number from the selected channel number and the channel numbers obtained by adding the first number and the second number to the selected channel number that have been used, and sets the selected channel number as the optimal channel number when the channel numbers have not been used.

18. An apparatus, comprising:
- a first unit transmitting information of the access point where the first unit is located at or receiving information of peripheral access point devices wirelessly;
- a second unit searching channel numbers used by the peripheral access point devices received from the first unit, the second unit receiving beacon frames from the peripheral access point devices for a predetermined time and extracting the channel numbers from the beacon frames and storing the extracted channel numbers when searching the channel numbers;
- the second unit deciding an optimal channel number from the channel numbers except for the used channel numbers, and setting the optimal channel number as a channel number; and
- a third unit managing and controlling the second unit.

19. The apparatus according to claim 18, wherein the second unit extracts the channel numbers from direct sequence parameter sets of frame bodies of the beacon frames.

20. The apparatus according to claim 19, wherein, when determining the optimal channel number, the second unit selects one of the channel numbers except for the used channel numbers, decides whether the channel numbers obtained by subtracting a first number and a second number from the selected channel number and the channel numbers obtained by adding the first number and the second number to the selected channel number have that been used, and sets the selected channel number as the optimal channel number when the channel numbers have not been used.

21. The computer-readable storage medium encoded with computer-executable instructions for performing a method, composed of:
- transmitting a probe request frame after setting a basic service set identifiers field of the probe request frame as broadcast basic service set identifiers;
- receiving probe response frames from peripheral access point devices for a predetermined time, and searching channel numbers used by the peripheral access point devices;
- extracting channel numbers from the received probe response frames, and storing the extracted channel numbers;
- extracting the channel numbers from direct sequence parameter sets of frame bodies of the probe response frames;
- selecting one of the channel numbers except for the used channel numbers, and deciding whether the selected channel number is an optimal channel number; and
- setting the selected channel number as a channel number when the selected channel number is the optimal channel number.

22. The computer-readable storage medium encoded with computer-executable instructions for performing a method, composed of:
- transmitting a probe request frame to the peripheral access point devices;
- receiving beacon frames transmitted from the peripheral access point devices for a predetermined time, searching channel numbers used by the peripheral access point devices, and
- extracting channel numbers from direct sequence parameter sets of frame bodies of the beacon frames;
- extracting the channel numbers from the beacon frames, and storing the extracted channel numbers;
- selecting one of the channel numbers except for the used channel numbers, and deciding whether the selected channel number is an optimal channel number; and
- setting the selected channel number as a channel number when the selected channel number is the optimal channel number.

23. The computer-readable storage medium encoded with computer-executable instructions for performing a method composed of:
- transmitting a probe request frame to the peripheral access point devices;
- receiving information from peripheral access point devices, and searching channel numbers used by the peripheral access point devices;
- extracting channel numbers from the received probe response frames;
- selecting one of the channel numbers except for the used channel numbers;
- deciding whether the channel numbers obtained by subtracting one and two from the selected channel number and the channel numbers obtained by adding one and two to the selected channel number have been used; and
- setting the selected channel number as a channel number when the selected channel number is the optimal channel number.

* * * * *